United States Patent
Frederick et al.

(10) Patent No.: US 8,226,003 B2
(45) Date of Patent: Jul. 24, 2012

(54) ADJUSTING PARAMETERS ASSOCIATED WITH LEAKAGE SIGNALS

(75) Inventors: Thomas J. Frederick, Chapel Hill, NC (US); Joseph P. Repke, Cary, NC (US)

(73) Assignee: Sirit Inc., Irvine, CA (US)

( * ) Notice: Subject to any disclaimer, the term of this patent is extended or adjusted under 35 U.S.C. 154(b) by 1106 days.

(21) Appl. No.: 11/741,654

(22) Filed: Apr. 27, 2007

(65) Prior Publication Data

US 2008/0041953 A1 Feb. 21, 2008

Related U.S. Application Data

(60) Provisional application No. 60/795,625, filed on Apr. 27, 2006.

(51) Int. Cl.
*G06K 7/08* (2006.01)
(52) U.S. Cl. ...... 235/451; 235/492; 340/10.1; 340/10.3; 340/10.4
(58) Field of Classification Search .................. 235/451; 375/285; 455/84
See application file for complete search history.

(56) References Cited

U.S. PATENT DOCUMENTS

| | | |
|---|---|---|
| 3,568,197 A | 3/1971 | Cubley |
| 3,663,932 A | 5/1972 | Mount et al. |
| 3,688,250 A | 8/1972 | Howlett |
| 3,696,429 A | 10/1972 | Tressa |
| 3,876,946 A | 4/1975 | La Clair et al. |
| 3,984,835 A | 10/1976 | Kaplan et al. |
| 4,243,955 A | 1/1981 | Daniel et al. |
| 4,297,672 A | 10/1981 | Fruchey et al. |
| 4,325,057 A | 4/1982 | Bishop |
| 4,509,123 A | 4/1985 | Vereen |
| 4,595,915 A | 6/1986 | Close |

(Continued)

FOREIGN PATENT DOCUMENTS

CA 2218269 4/1999

(Continued)

OTHER PUBLICATIONS

International Search Report and Written Opinion of the International Searching Authority issued in counterpart International Application No. PCT/US2007/067687; Jan. 10, 2008; 11 pages.

(Continued)

*Primary Examiner* — Thien M. Le
*Assistant Examiner* — Christopher Stanford
(74) *Attorney, Agent, or Firm* — Fish & Richardson P.C.

(57) ABSTRACT

The present disclosure includes a system and method for adjusting parameters associated with leakage signals. In some implementations, an RFID reader includes an RF antenna, a transmitter section, a receiver section, a control module and a cancellation noise reduction (CNR) section. The transmitter section is coupled to the RF antenna and operable to generate a transmit signal to be transmitted by the RF antenna. The receiver section is coupled to the RF antenna and operable to receive a receive signal from the RF antenna. In addition, the receiver section further includes a de-rotation module and a control module. The de-rotation module is operable to de-rotate, by $\theta$, an in-phase signal and quadrature signal associated with the leakage signal. The control module is operable to generate control signals used to produce a signal for reducing the leakage signal in a receive path of the reader. The CNR section is operable to subtract from the reduction signal from the leakage signal.

16 Claims, 5 Drawing Sheets

U.S. PATENT DOCUMENTS

| | | | |
|---|---|---|---|
| 4,849,706 A | 7/1989 | Davis et al. |
| 4,857,925 A | 8/1989 | Brubaker |
| 4,870,391 A | 9/1989 | Cooper |
| 4,873,529 A | 10/1989 | Gibson |
| 4,903,033 A | 2/1990 | Tsao et al. |
| 4,968,967 A | 11/1990 | Stove |
| 5,012,225 A | 4/1991 | Gill |
| 5,021,780 A | 6/1991 | Fabiano et al. |
| 5,038,283 A | 8/1991 | Caveney |
| 5,095,536 A | 3/1992 | Loper |
| 5,165,109 A | 11/1992 | Han et al. |
| 5,278,563 A | 1/1994 | Spiess |
| 5,278,569 A | 1/1994 | Ohta et al. |
| 5,293,408 A | 3/1994 | Takahashi et al. |
| 5,334,822 A | 8/1994 | Sanford |
| 5,381,157 A | 1/1995 | Shiga |
| 5,396,489 A | 3/1995 | Harrison |
| 5,430,441 A | 7/1995 | Bickley et al. |
| 5,444,864 A | 8/1995 | Smith |
| 5,461,374 A | 10/1995 | Lewiner et al. |
| 5,477,215 A | 12/1995 | Mandelbaum |
| 5,495,500 A | 2/1996 | Jovanovich et al. |
| 5,506,584 A | 4/1996 | Boles |
| 5,519,729 A | 5/1996 | Jurisch et al. |
| 5,539,394 A | 7/1996 | Cato et al. |
| 5,608,379 A | 3/1997 | Narlow et al. |
| 5,613,216 A | 3/1997 | Galler |
| 5,630,072 A | 5/1997 | Dobbins |
| 5,648,767 A | 7/1997 | O'Connor et al. |
| 5,649,295 A | 7/1997 | Shober et al. |
| 5,661,485 A | 8/1997 | Manuel |
| 5,661,494 A | 8/1997 | Bondyopadhyay |
| 5,668,558 A | 9/1997 | Hong |
| 5,708,423 A | 1/1998 | Ghaffari et al. |
| 5,729,576 A | 3/1998 | Stone et al. |
| 5,745,037 A | 4/1998 | Guthrie et al. |
| 5,777,561 A | 7/1998 | Chieu et al. |
| 5,784,414 A | 7/1998 | Bruekers et al. |
| 5,825,753 A | 10/1998 | Betts et al. |
| 5,831,578 A | 11/1998 | Lefevre |
| 5,841,814 A | 11/1998 | Cupo |
| 5,850,187 A | 12/1998 | Carrender et al. |
| 5,861,848 A | 1/1999 | Iwasaki |
| 5,892,396 A | 4/1999 | Anderson et al. |
| 5,898,405 A | 4/1999 | Iwasaki |
| 5,905,405 A | 5/1999 | Ishizawa |
| 5,940,006 A | 8/1999 | MacLellan et al. |
| 5,974,301 A | 10/1999 | Palmer et al. |
| 6,025,780 A | 2/2000 | Bowers et al. |
| 6,026,378 A | 2/2000 | Onozaki |
| 6,084,530 A | 7/2000 | Pidwerbetsky et al. |
| 6,094,149 A | 7/2000 | Wilson |
| 6,107,910 A | 8/2000 | Nysen |
| 6,121,929 A | 9/2000 | Olson et al. |
| 6,137,447 A | 10/2000 | Saitoh et al. |
| 6,177,861 B1 | 1/2001 | MacLellan et al. |
| 6,192,225 B1 | 2/2001 | Arpaia et al. |
| 6,219,534 B1 | 4/2001 | Torii |
| 6,229,817 B1 | 5/2001 | Fischer et al. |
| 6,229,987 B1 | 5/2001 | Greeff et al. |
| 6,232,837 B1 | 5/2001 | Yoo et al. |
| 6,275,192 B1 | 8/2001 | Kim |
| 6,317,027 B1 | 11/2001 | Watkins |
| 6,320,542 B1 | 11/2001 | Yamamoto et al. |
| 6,366,216 B1 | 4/2002 | Olesen |
| 6,412,086 B1 | 6/2002 | Friedman et al. |
| 6,414,626 B1 | 7/2002 | Greef et al. |
| 6,442,276 B1 | 8/2002 | Doljack |
| 6,456,668 B1 | 9/2002 | MacLellan et al. |
| 6,459,687 B1 | 10/2002 | Bourlas et al. |
| 6,466,130 B2 | 10/2002 | Van Horn et al. |
| 6,492,933 B1 | 12/2002 | McEwan |
| 6,501,807 B1 | 12/2002 | Chieu et al. |
| 6,531,957 B1 | 3/2003 | Nysen |
| 6,538,564 B1 | 3/2003 | Cole |
| 6,566,997 B1 | 5/2003 | Bradin |
| 6,567,648 B1 | 5/2003 | Ahn et al. |
| 6,603,391 B1 | 8/2003 | Greeff et al. |
| 6,639,509 B1 | 10/2003 | Martinez |
| 6,686,830 B1 * | 2/2004 | Schirtzer ................... 340/10.2 |
| 6,700,547 B2 | 3/2004 | Mejia et al. |
| 6,714,121 B1 | 3/2004 | Moore |
| 6,714,133 B2 | 3/2004 | Hum et al. |
| 6,768,441 B2 | 7/2004 | Singvall et al. |
| 6,774,685 B2 | 8/2004 | O'Toole et al. |
| 6,784,789 B2 | 8/2004 | Eroglu et al. |
| 6,794,000 B2 | 9/2004 | Adams et al. |
| 6,798,384 B2 | 9/2004 | Aikawa et al. |
| 6,816,125 B2 | 11/2004 | Kuhns et al. |
| 6,819,938 B2 | 11/2004 | Sahota |
| 6,831,603 B2 | 12/2004 | Menache |
| 6,838,989 B1 | 1/2005 | Mays et al. |
| 6,888,509 B2 | 5/2005 | Atherton |
| 6,974,928 B2 | 12/2005 | Boom |
| 6,996,164 B1 * | 2/2006 | Blount et al. ................ 375/219 |
| 7,009,496 B2 | 3/2006 | Arneson et al. |
| 7,034,689 B2 | 4/2006 | Teplitxky et al. |
| 7,039,359 B2 | 5/2006 | Martinez |
| 7,043,269 B2 | 5/2006 | Ono et al. |
| 7,053,755 B2 | 5/2006 | Atkins et al. |
| 7,058,368 B2 | 6/2006 | Nicholls et al. |
| 7,084,769 B2 | 8/2006 | Bauer et al. |
| 7,088,248 B2 | 8/2006 | Forster |
| 7,091,828 B2 | 8/2006 | Greeff et al. |
| 7,095,324 B2 | 8/2006 | Conwell et al. |
| 7,095,985 B1 | 8/2006 | Hofmann |
| 7,099,406 B2 | 8/2006 | Najarian et al. |
| 7,099,671 B2 | 8/2006 | Liang |
| 7,100,835 B2 | 9/2006 | Selker |
| 7,109,867 B2 | 9/2006 | Forster |
| 7,155,172 B2 | 12/2006 | Scott |
| 7,180,402 B2 | 2/2007 | Carrender et al. |
| 7,197,279 B2 | 3/2007 | Bellantoni |
| 7,199,713 B2 | 4/2007 | Barink et al. |
| 7,215,976 B2 | 5/2007 | Brideglall |
| 7,221,900 B2 | 5/2007 | Reade et al. |
| 7,256,682 B2 | 8/2007 | Sweeney, II |
| 7,257,079 B1 | 8/2007 | Bachrach |
| 7,284,703 B2 | 10/2007 | Powell et al. |
| 7,357,299 B2 | 4/2008 | Frerking |
| 7,375,634 B2 | 5/2008 | Sprague |
| 7,385,511 B2 | 6/2008 | Muchkaev |
| 7,388,468 B2 | 6/2008 | Diorio et al. |
| 7,388,501 B2 | 6/2008 | Tang et al. |
| 7,409,194 B2 | 8/2008 | Shi et al. |
| 7,411,505 B2 | 8/2008 | Smith et al. |
| 7,413,124 B2 | 8/2008 | Frank et al. |
| 7,429,953 B2 | 9/2008 | Buris et al. |
| 7,432,817 B2 | 10/2008 | Phipps et al. |
| 7,432,874 B2 | 10/2008 | Meissner |
| 7,440,743 B2 | 10/2008 | Hara et al. |
| 7,450,919 B1 | 11/2008 | Chen et al. |
| 7,460,014 B2 | 12/2008 | Pettus |
| 7,477,887 B2 | 1/2009 | Youn |
| 7,479,874 B2 | 1/2009 | Kim et al. |
| 7,492,812 B2 | 2/2009 | Ninomiya et al. |
| 7,526,266 B2 | 4/2009 | Al-Mahdawi |
| 7,548,153 B2 | 6/2009 | Gravelle et al. |
| 7,551,085 B2 | 6/2009 | Pempsell et al. |
| 7,557,762 B2 | 7/2009 | Shimasaki et al. |
| 7,561,866 B2 | 7/2009 | Oliver et al. |
| 7,562,083 B2 | 7/2009 | Smith et al. |
| 7,570,164 B2 | 8/2009 | Chakraborty et al. |
| 7,576,657 B2 | 8/2009 | Duron et al. |
| 7,580,378 B2 | 8/2009 | Carrender et al. |
| 7,583,179 B2 | 9/2009 | Wu et al. |
| 7,586,416 B2 | 9/2009 | Ariyoshi et al. |
| 7,592,898 B1 | 9/2009 | Ovard et al. |
| 7,592,915 B2 | 9/2009 | Liu |
| 7,594,153 B2 | 9/2009 | Kim et al. |
| 7,595,729 B2 | 9/2009 | Ku et al. |
| 7,596,189 B2 | 9/2009 | Yu et al. |
| 7,606,532 B2 | 10/2009 | Wuidart |
| 7,609,163 B2 | 10/2009 | Shafer |
| 7,612,675 B2 | 11/2009 | Miller et al. |
| 2001/0048715 A1 | 12/2001 | Lee et al. |
| 2002/0021208 A1 | 2/2002 | Nicholson et al. |

| | | |
|---|---|---|
| 2002/0067264 A1 | 6/2002 | Soehnlen |
| 2002/0072344 A1 | 6/2002 | Souissi |
| 2002/0080728 A1 | 6/2002 | Sugar et al. |
| 2002/0119748 A1 | 8/2002 | Prax et al. |
| 2002/0141347 A1 | 10/2002 | Harp et al. |
| 2003/0021367 A1 | 1/2003 | Smith |
| 2003/0052161 A1 | 3/2003 | Rakers et al. |
| 2003/0228860 A1 | 12/2003 | Jou |
| 2005/0084003 A1 | 4/2005 | Duron et al. |
| 2005/0099270 A1 | 5/2005 | Diorio et al. |
| 2005/0099340 A1 | 5/2005 | Suzuki |
| 2005/0107051 A1 | 5/2005 | Aparin et al. |
| 2005/0114326 A1 | 5/2005 | Smith et al. |
| 2005/0116867 A1 | 6/2005 | Park et al. |
| 2005/0156031 A1 | 7/2005 | Goel et al. |
| 2005/0179520 A1 | 8/2005 | Ziebertz |
| 2005/0207509 A1 | 9/2005 | Saunders et al. ............... 375/285 |
| 2005/0237843 A1 | 10/2005 | Hyde |
| 2005/0259768 A1 | 11/2005 | Yang et al. |
| 2006/0022800 A1 | 2/2006 | Krishna et al. |
| 2006/0033607 A1 | 2/2006 | Bellantoni |
| 2006/0086809 A1 | 4/2006 | Shanks et al. |
| 2006/0098765 A1 | 5/2006 | Thomas et al. |
| 2006/0103533 A1 | 5/2006 | Pahlavan et al. |
| 2006/0125603 A1 | 6/2006 | Nahear |
| 2006/0132313 A1 | 6/2006 | Moskowitz |
| 2006/0183454 A1 | 8/2006 | Al-Mahdawi |
| 2006/0214773 A1 | 9/2006 | Wagner et al. |
| 2006/0238302 A1 | 10/2006 | Loving et al. |
| 2006/0252398 A1 | 11/2006 | Park et al. |
| 2006/0267734 A1 | 11/2006 | Taki et al. |
| 2006/0290502 A1 | 12/2006 | Rawlings |
| 2007/0001809 A1 | 1/2007 | Kodukula et al. |
| 2007/0001813 A1 | 1/2007 | Maguire et al. |
| 2007/0018792 A1 | 1/2007 | Take et al. |
| 2007/0046432 A1 | 3/2007 | Aiouaz et al. |
| 2007/0060075 A1 | 3/2007 | Mikuteit |
| 2007/0082617 A1 | 4/2007 | McCallister |
| 2007/0133392 A1 | 6/2007 | Shin et al. |
| 2007/0139200 A1 | 6/2007 | Yushkov et al. |
| 2007/0164868 A1 | 7/2007 | Deavours et al. |
| 2007/0188305 A1 | 8/2007 | Drucker |
| 2007/0206704 A1 | 9/2007 | Zhou et al. |
| 2007/0206705 A1 | 9/2007 | Stewart |
| 2007/0222604 A1 | 9/2007 | Phipps et al. |
| 2007/0222606 A1 | 9/2007 | Phipps et al. |
| 2007/0236335 A1 | 10/2007 | Aiouaz et al. |
| 2007/0285238 A1 | 12/2007 | Batra |
| 2007/0290846 A1 | 12/2007 | Schilling et al. |
| 2008/0012688 A1 | 1/2008 | Ha et al. |
| 2008/0018431 A1 | 1/2008 | Turner et al. |
| 2008/0048867 A1 | 2/2008 | Oliver et al. |
| 2008/0049870 A1 | 2/2008 | Shoarinejad et al. |
| 2008/0065957 A1 | 3/2008 | Shoarinejad et al. |
| 2008/0068173 A1 | 3/2008 | Alexis et al. |
| 2008/0084310 A1 | 4/2008 | Nikitin et al. |
| 2008/0136595 A1 | 6/2008 | Finkenzeller |
| 2008/0143486 A1 | 6/2008 | Downie et al. |
| 2008/0191961 A1 | 8/2008 | Tuttle |
| 2008/0258916 A1 | 10/2008 | Diorio et al. |
| 2008/0278286 A1 | 11/2008 | Takaluoma et al. |
| 2009/0022067 A1 | 1/2009 | Gotwals |
| 2009/0053996 A1 | 2/2009 | Enguent et al. |
| 2009/0091454 A1 | 4/2009 | Tuttle |
| 2009/0096612 A1 | 4/2009 | Seppa et al. |
| 2009/0101720 A1 | 4/2009 | Dewan et al. |

FOREIGN PATENT DOCUMENTS

| | | |
|---|---|---|
| EP | 0133317 | 2/1985 |
| EP | 0498369 | 8/1992 |
| EP | 0156440 | 12/1992 |
| EP | 0915573 | 5/1999 |
| EP | 0923061 | 6/1999 |
| EP | 1095427 | 5/2001 |
| EP | 1436857 | 7/2004 |
| FR | 2648602 | 12/1990 |
| GB | 1270456 | 4/1972 |
| JP | 1158836 | 6/1989 |
| JP | 2002-185381 | 6/2002 |
| JP | 2005-227818 | 8/2005 |
| JP | 2005-253058 | 9/2005 |
| JP | 2006-252367 | 9/2006 |
| KR | 2002-0091572 | 12/2002 |
| WO | WO 90/16119 | 12/1990 |
| WO | WO 96/15596 | 5/1996 |
| WO | WO 99/05659 | 2/1999 |
| WO | WO 00/21204 | 4/2000 |
| WO | WO 01/24407 | 4/2001 |
| WO | WO 03/044892 | 5/2003 |
| WO | WO 04/001445 | 12/2003 |
| WO | WO 2005/072137 | 8/2005 |
| WO | WO 2005/109500 | 11/2005 |
| WO | WO 2006/037241 | 4/2006 |
| WO | WO 2006/068635 | 6/2006 |
| WO | WO 2007/003300 | 1/2007 |
| WO | WO 2007/094787 | 8/2007 |
| WO | WO 2007/126240 | 11/2007 |
| WO | WO 2009/058809 | 5/2009 |

OTHER PUBLICATIONS

International Preliminary Report on Patentability issued in International Application No. PCT/US2007/067687, Oct. 28, 2008, 7 pages.

Bridgelall, Raj; "Bluetooth/802.11 Protocol Adaptation for RFID Tags"; Symbol Technologies, Research & Development, One Symbol Plaza, Holtsville, New York 11742; 4 pages. Retrieved from <http://www2.ing.unipi.it/ew2002/proceedings/001.pdf>.

Burgener, E.C.; "A Personal Transit Arrival Time Receiver;" IEEE—IEE Vehicle Navigation & Information Systems Conference; Ottawa, Ontario, Canada; 1993; pp. 54-55. Retrieved from <http://ieeexplore.ieee.org/xpl/freeabs_all.jsp?arnumber=585583>.

Cavoukian, Ann; "Adding an On/Off Device to Activate the RFID in Enhanced Driver's Licenses: Pioneering a Made-in-Ontario Transformative Technology that Delivers Both Privacy and Security"; Information and Privacy Commissioner of Ontario; Ontario, Canada; Mar. 2009; 3 pages. Retrieved from <http://www.ipc.on.ca/images/Resources/edl.pdf.>.

Desmons, Dimitri; "UHF Gen 2 for Item-Level Tagging"; Impinji, Inc.; 24 pages. Retrieved from <http://www.impinj.com/files/Impinj_ILT_RFID_World.pdf>.

Han Y. et al.; "System Modeling and Simulation of RFID"; Auto-ID Labs at Fudan University, Shanghai, P.R. China; 12 pages. Retrieved from <http://citeseerx.ist.psu.edu/viewdoc/download?doi=10.1.1.116.7275&rep=rep1&type=pdf>.

Hansen, T. et al.; "Method for Controlling the Angular Extent of Interrogation Zones in RFID"; Seknion, Inc., 2000 Commonwealth Avenue, Suite 1008, Boston, MA 02135; 12 pages. Retrieved from <http://seknion.com/DOWNLOADS/Seknion_Paper_RFID.pdf>.

Hiltunen, Kimmo; "Using RF Repeaters to Improve WCDMA HSDPA Coverage and Capacity inside Buildings"; The 17th Annual IEEE International Symposium on Personal, Indoor, and Mobile Radio Communications (PIMRC-06); 2006; 5 pages. Retrieved from <http://www.ericsson.com/technology/research_papers/wireless_access/doc/PIMRC06_hiltunen.pdf>.

Khandelwal, G. et al. "Intelligent MAC Design for RFID Networks"; The Pennsylvania State University; 1 page.

Khandelwal, G. et al.; "OPT: Optimal Protocol Tree for Efficient Tag Identification in Dense RFID Systems"; IEEE International Conference on Communications; Jun. 11-15, 2006; pp. 128-133.

Kusy et al.; "Tracking Mobile Nodes Using RF Doppler Shifts"; Vanderbilt University, Nashville, Tennessee; 14 pages. Retrieved from <http://www.isis.vanderbilt.edu/sites/default/files/Kusy_B_11_7_2007_Tracking_M.pdf>.

"New Alien Software Can Identify Velocity, Position of Tags"; RFID News; Apr. 14, 2008; 2 pages. Retrieved from <http://www.rfidnews.org/2008/04/14/new-alien-software-can-identify-velocity-position-of-tags>.

O'Connor, Mary Catherine; "Wal-Mart Seeks UHF for Item-Level"; RFID Journal, Inc.; 2005; 2 pages. Retrieved from < http://www.rfidjournal.com/article/articleview/2228/1/1/>.

Rohatgi, A. et al.; "Implementation of an Anti-Collision Differential-Offset Spread Spectrum FRID System"; Georgia Institute of Technology, School of Electrical and Computer Engineering; IEEE Antennas Propagation Society International Symposium 2006; 4 pages. Retrieved from <http://www.propagation.gatech.edu/Archive/PG_CP_060710_AR/PG_CP_060710_AR.PDF>.

Waldrop et al.; "Colorwave: A MAC for RFID Reader Networks"; Auto-ID Center, Massachusetts Institute of Technology, Cambridge, MA; 4 pages.

Yu, P. et al.; "Securing RFID with Ultra-Wideband Modulation"; Virginia Tech Electrical and Computer Engineering Department; Blacksburg, VA; Workshop on RFID Security; Jul. 2006; 12 pages. Retrieved from <http://events.iaik.tugraz.at/RFIDSec06/Program/papers/004%20-%20Ultra%20Wideband%20Modulation.pdf>.

"Near Field UHF Versus HF"; IDTechEx; May 16, 2006; 1 page. Retrieved from <http://www.idtechex.com/research/articles/near_field_uhf_versus_hf_00000474.asp>.

Kiming, Q. et al.; "Development of a 3cm Band Reflected Power Canceller"; Research Institute of Navigation Technology; 2001 CIE International Conference on, Proceedings; 2001; pp. 1098-1102.

"Developments in Printed Conductors and Tags"; IDTechEx; Jun. 6, 2005; 1 page. Retrieved from <http://www.idtechex.com/research/articles/developments_in_printed_conductors_and_tags_00000188.asp>.

Ryu, H-K. et al.; "Size Reduction in UHF Band RFID Tag Antenna Based on Circular Loop Antenna"; 18th International Conference on Applied Electromagnetics and Communications, ICECom; Oct. 12-14, 2005; pp. 1-4.

Binu P, et al.; "A New Microstrip Patch Antenna for Mobile Communications and Bluetooth Applications"; Microwave and Optical Technology Letters; vol. 33, No. 4, May 20, 2002; pp. 285-286.

Garg et al.; "Microstrip Radiators"; Microstrip Antenna Design Handbook; Artech House, Inc. Norwood, MA; 2001; pp. 1-72.

"Radio Frequency Identification (RFID) Primer'" 23 pages. Retrieved from <http://ocw.mit.edu/NR/rdonlyres/Sloan-School-of-Management/15-762JSpring-2005/23F46055-7F21-4046-B2C3-7E96680790DD/0/rfid_primer.pdf>.

Donovan, John; "Software-Defined Radio Tackles Wireless Compatibility Issues"; Portable Design; Apr. 2006; pp. 8-12. Retrieved from <http://www.qmags.com/download/default.aspx?pub=PD&upid=11675&fl=others/PD/PD_20060401_Apr_2006.pdf>.

* cited by examiner

ADJUSTING PARAMETERS ASSOCIATED WITH LEAKAGE SIGNALS

CLAIM OF PRIORITY

This application claims priority under 35 USC §119(e) to U.S. Patent Application Ser. No. 60/795,625, filed on Apr. 27, 2006, the entire contents of which are hereby incorporated by reference.

TECHNICAL FIELD

This invention relates to Radio Frequency IDentification (RFID) Readers and, more particularly, to adjusting parameters associated with leakage signals.

BACKGROUND

Passive UHF RFID (radio frequency identification) protocols require the tag to be powered by the reader's field and to use the field to backscatter information on the same frequency. The technical term for such a system, where both the transmit and receive sections of the device are simultaneously operating on the same frequency is "homodyne." One class of homodyne systems intends to only transmit a pure continuous sinusoidal wave (CW) signal while in the receive mode. UHF RFID reader systems are of this class. A challenge is presented to the homodyne systems when the receiver section is not well isolated from the transmitter section. Transmitter (TX) leakage into the receive (RX) path can be as much as 110 dB above the desired backscattered receive signal. Such a high TX leakage to receive signal ratio leaves the receiver section quite susceptible to typical nonlinearities associated with standard cost effective analog signal processing components. Therefore an unusually high dynamic range in the receiver section would be required.

Passive and semi-active (battery assisted) UHF RFID communications use radar cross section (RCS) modulation to send data from the transponder to the reader. That means the reader transmits a sinusoidal RF signal toward the transponder. Some of the RF energy which hits the transponder reflects back to the reader. By modulating its RCS, the transponder is able to communicate data back to the reader.

This presents many design challenges. In particular, the reader electronics must be designed to receive a very weak signal while it is transmitting a very strong signal at the same frequency. Whereas many other wireless communications schemes use frequency division multiplexing, the RFID reader cannot since its own transmit field is being used as a medium for communications from transponder to reader. The transmit signal may be 1 watt or more, while the receive signal for semi-active transponders (those which only use the RF signal for communications, not for power) may be as low as 1 picowatt ($10^{-12}$ watt), e.g., 12 orders of magnitude less power. For passive transponders the receive strength is usually at least 1 nanowatt ($10^{31\ 9}$ watt), which is still pretty challenging.

SUMMARY

The present disclosure includes a system and method for adjusting parameters associated with leakage signals. In some implementations, an RFID reader includes an RF antenna, a transmitter section, a receiver section, a control module and a cancellation noise reduction (CNR) section. The transmitter section is coupled to the RF antenna and operable to generate a transmit signal to be transmitted by the RF antenna. The receiver section is coupled to the RF antenna and operable to receive a receive signal from the RF antenna. In addition, the receiver section further includes a de-rotation module and a control module. The de-rotation module is operable to de-rotate, by $\theta$, an in-phase signal and quadrature signal associated with the leakage signal. The control module is operable to generate control signals used to produce a signal for reducing the leakage signal in a receive path of the reader. The CNR section is operable to subtract the reduction signal from the leakage signal.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
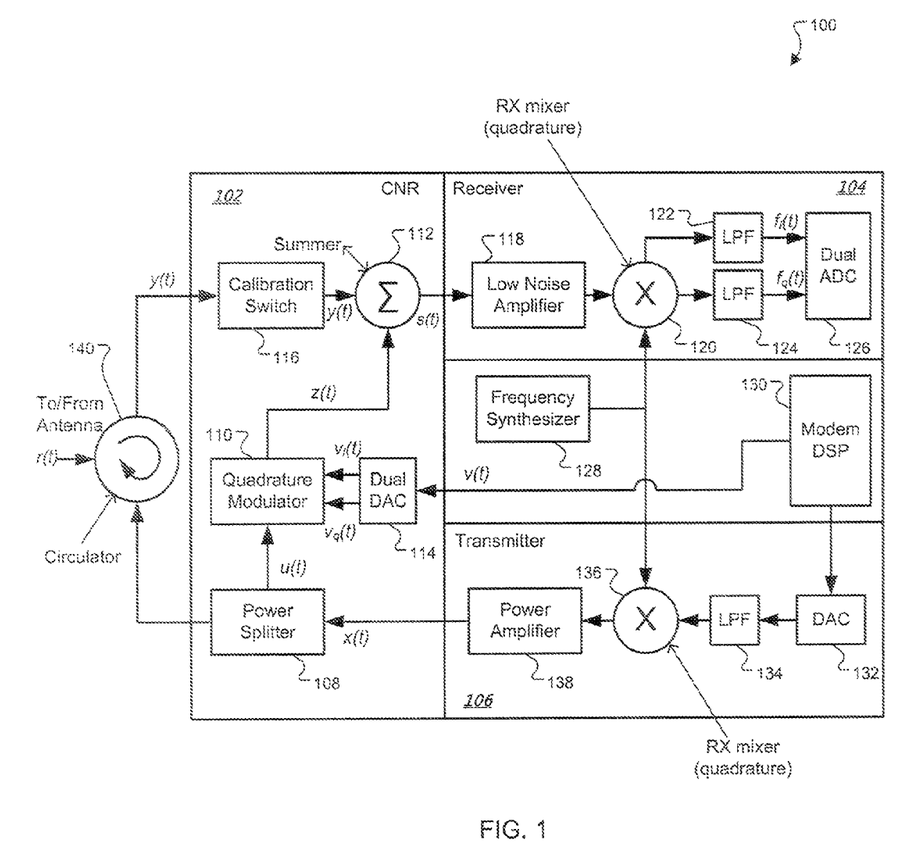
FIG. 1 is a block diagram illustrating an example RFID reader in accordance with some implementations of the present disclosure.

FIG. 1 is an example RFID reader 100 for reducing leakage signal in a receive path in accordance with some implementations in the present invention. For example, the reader 100 may reduce a DC offset and/or phase offset associated with error signals used to compensate for leakage signal, in general, a leakage signal is interference generated from a transmit signal that is added to a receive path. Transmitter leakage into the receive path can be as much as 110 dB above the desired backscattered receive signal. Such a high leakage signal to receive signal ratio can leave the baseband signals susceptible to typical nonlinearities associated with standard cost effective analog signal processing components. In the case that a reader has perfect transmitter-to-receiver isolation, only the reflected signal from the transponder would make it into the receiver. Leakage associated with the transmit signal frequently generates interference in the receive signal and may result from one or more sources such as reflections off other nearby objects in the vicinity, infernal circuit reflections caused by non-ideal impedance matching, and/or other sources. In some implementations, the reader 100 offers approximately 40 dB (4 orders of magnitude) of isolation. In eliminating, minimizing or otherwise reducing the leakage signal, the reader 100 may generate control signals that are quadrature modulated with a portion of the transmission signal to generate a cancellation signal, i.e., a signal that when added to a receive path can reduce leakage signals. In the process of generating the control signals, the reader 100 may generate DC offsets and/or phase offsets that interfere with the estimated control signals. In some implementations, the DC offsets and the phase offsets may be referred to as nuisance parameters. The DC offsets can include offsets of the baseband signals that can result, for example, from amplifiers, analog-to-digital converters (ADC), and other elements in the reader 100. The phase offsets can include offsets in the phase of the baseband signals that can result, for example, from quadrature modulators, summers, low noise amplifiers, down conversion mixers, baseband filters, and others. By compensating for such DC offsets and/or phase offsets, the reader 100 may enhance, maximize, or increase the reduction in the leakage signal in the receive path.

In some implementations, the reader 100 may estimate the transmit signal as:

$$x(t)=A(t)\cos(2\pi F_c t+\phi(t)+\theta),$$

where $A(t)$ represents slow amplitude variations, $\phi(t)$ represents the oscillator phase noise, and $\theta$ represents the phase angle of the transmit signal out of, for example, a power amplifier. In addition to the receive signal in the receive path, the reader may also include leakage signals in the receive path and the combination of these signals may be expressed as:

$$y(t)=r(t)+c(t)\cdot A(t)\cos(2\pi F_c t+\phi(t)+\vartheta(t)+\theta),$$

where $r(t)$ is the receive signal from transponders and other RF environmental signals and the rest may estimate the leakage signal from the transmitter, where, in some implementations, $c(t) \ll 1$ and $0 \leq \vartheta(t) < 2\pi$ can represent slow variations in transmit leakage amplitude and/or phase and both can vary slowly over time. During the course of this description, the leakage current is described in polar coordinates but may also be described in other coordinates such as rectangular. In some implementations, the leakage current may be expressed as a portion of an in-phase signal and a quadrature signal, as discussed in more detail below.

In the illustrated implementation, the reader 100 includes a carrier-noise-reduction (CNR) module 102, a receiver module 104, and a transmitter module 106. The CNR module 102 includes any software, hardware, and/or firmware operable to reduce leakage signals in the receive path. For example, the CNR module 102 may add signals to the receive path for canceling, minimizing, or otherwise reducing leakage signals. In the illustrated implementation, the CNR module 102 includes a power splitter 108, a quadrature modulator 110, a summer 112, a dual digital-to-analog converter (DAC) 114, and a calibration switch 116. The power splitter 108 splits or otherwise directs a portion of the transmit signal to the quadrature modulator 110. In some implementations, the portion of the transmit signal may be expressed as:

$$u(t)=b_1 \cdot x(t),$$

where $b_1$ is a fixed small constant (e.g., $b_1=0.05$). In addition to receiving a portion of the transmit signal, the quadrature modulator 110 receives an in-phase control signal $v_i(t)$ and a quadrature control signal $v_q(t)$. In some implementations, the control signals may be polar controls. The quadrature modulator 110 can modulate the portion of the transmit signal (e.g., $u(t)$) and the baseband quadrature control signals $v_i(t)$ and $v_q(t)$ to generate a cancellation signal for the leakage signal. In some implementations, the quadrature modulator 110 includes a vector modulator.

In some implementations, the quadrature modulator 110 may estimate the cancellation signals as:

$$z(t)=b_2 A(t)(v_i(t)\cos(2\pi F_c t+\phi(t)+\theta)+v_q(t)\sin(2\pi F_c t+\phi(t)+\theta))$$

where $b_2$ is a fixed small constant (e.g., $b_2=0.01$). In some implementations, the constant $b_2$ accounts for the combined signal attenuation through the power splitter ($b_1$) and the quadrature modulator 110. In the example expression for the cancellation signal, the quadrature modulator 110 uses the input $u(t)$ to generate a 90 degree shifted version (sine), then modulates the control signals $v_i(t)$ and $v_q(t)$ onto these cosine and sine carriers, respectively, to produce the cancellation signal.

After generating the cancellation signal, the quadrature module 110 directs the cancellation signal to the summer 112. The summer 112 subtracts the cancellation signal from the signal received from the receiver which includes the leakage signal. In the example, the summer 112 subtracts the quadrature modulator output signal $z(t)$ from the receiver input $y(t)$ to produce $s(t)$. In some implementations, the residual signal $s(t)$ substantially equals the desired receive signal $r(t)$, i.e., substantially all of the transmitter leakage is cancelled. The CNR module 102 can represent the residual signal as:

$$s(t)=b_2 A(t)(c(t)\cdot\cos(2\pi F_c t+\phi(t)+\vartheta(t)+\theta)+v_i(t)\cos(2\pi F_c t+\phi(t)+\theta)+v_q(t)\sin(2\pi F_c t+\phi(t)+\theta))+r(t)$$

In some implementations, the CNR module 102 includes the dual DAC for converting digital control signals to analog control signals and directing the analog control signals to the quadrature modulator 110. In some implementations, the control signals are generated as a sampled data signal and these signals are passed through a dual digital-to-analog converter (DAC) to create the analog control signals for the quadrature modulator 110. In other words, the control signals $v_i(t)$ and $v_q(t)$ can comprise digital signals received from the dual DAC 114. In some implementations, the control signals $v_i(t)$ and $v_q(t)$ may be generated from analog control circuitry. The calibration switch 116 can substantially prevent input signals into the receive module 104 when the DC offsets and/or the phase offsets are estimated. The reader 100 also includes a circulator 140. The circulator 140 directs the transmit signals towards the antenna and also directs receive signals from the antenna to the CNR module 102. The circulator 140 could be replaced with a coupler or separate transmit and receive antennas could be used, commonly known as a bi-static antenna configuration.

The receiver module 104 can include any software, hardware, and/or firmware operable to down convert the received signal to baseband signals for processing by the DSP 130. For example, the receiver module 104 may convert an RF signal to a baseband signal. In some implementations, the baseband signal is a low frequency signal (e.g., DC to 400 KHz). In addition, the receiver module 104 may perform other functions such as amplification, filtering, conversion between analog and digital signals, and/or others. The receiver module 104 may produce the baseband signals using a mixer and low pass filters. In the illustrated implementations, the receiver module 104 includes a low noise amplifier (LNA) 118, a mixer 120, a low pass filters (LPFs) 122 and 124, and a dual ADC 126. The LNA 118 receives the residual signal from the summer 112 and amplifiers the residual signal in light of the relative weakness of the signal to the transmission signal. The mixer 120 mixes the residual signal with a signal received from a frequency synthesizer 128 to generate two component signals. In the illustrated implementation, the mixer 120 generates an in-phase signal and a quadrature signal. For example, the receiver module 104 can amplify the residual signal $s(t)$ using the LNA 118 and then mix down the signal to baseband using a combination of the quadrature mixer 120 and the LPFs 122 and 124. The LPFs 122 and 124 can reject the out of band energy of transceivers in neighboring channels. In doing so, the effect of out of band noise can be made relatively small through intelligent selection of band-limiting baseband filters. In some implementations, the signals generated from the down conversion may be substantially estimated as:

$$e_i(t) = \frac{b_2 A(t)}{2}(c(t) \cdot \cos(\phi(t) + \vartheta(t)) + v_i(t)\cos\phi(t) +$$
$$v_q(t)\sin\phi(t)) + r(t)\cos(2\pi F_c t)$$
$$= \frac{b_2 A(t)}{2}((c(t) \cdot \cos\vartheta(t) + v_i(t))\cos\phi(t) +$$
$$(v_q(t) - c(t) \cdot \sin\vartheta(t))\sin\phi(t)) + r(t)\cos(2\pi F_c t)$$

and $$e_q(t) = \frac{b_2 A(t)}{2}(-c(t) \cdot \sin(\phi(t) + \vartheta(t)) - v_i(t)\sin\phi(t) + v_q(t)\cos\phi(t)) +$$
$$r(t)\sin(2\pi F_c t)$$
$$= \frac{b_2 A(t)}{2}((v_q(t) - c(t) \cdot \sin\vartheta(t))\cos\phi(t) -$$
$$(c(t) \cdot \cos\vartheta(t) + v_i(t))\sin\phi(t)) + r(t)\sin(2\pi F_c t)$$

In this case, the following control signals $v_i(t)$ and $v_q(t)$ may be used to substantially eliminate the leakage signal:

$$v_i(t) = -c(t) \cdot \cos\vartheta(t)$$

and $$v_q(t) = c(t) \cdot \sin\vartheta(t).$$

A number of primary and secondary circuit and/or system impairments can limit performance of the reader 100. To indicate this difference, the baseband signals, i.e., the in-phase signal and the quadrature signal, into the dual ADC 126 are denoted as $f_i(t)$ and $f_q(t)$ as compared with $e_i(t)$ and $e_q(t)$.

The receiver module 104 passes or otherwise directs the baseband signals to the digital signal processor (DSP) 130. The DSP 130 can include any software, hardware, and/or firmware operable to process the residual signal. For example, the DSP 130 may generate control signals for adjusting the cancellation signal used to compensate for leakage signal. In some implementations, the DSP 130 compensates the baseband signals for DC offset and/or phase offset. As mentioned above, the reader 100 may include elements that subtract DC offsets and/or de-rotate phase offsets in the baseband signals. Otherwise, these offsets can reduce the efficacy of the cancellation signal in reducing the leakage signal. In other words, the DSP 130 may eliminate, minimize, or otherwise reduce the DC offset and/or the phase offset to reduce error in the cancellation signal. In the case of DC offset, the DSP 130 can, in some implementations, subtract estimates of the DC offsets in the baseband signals such as the in-phase signal and the quadrature signal. For example, the DSP 130 may determine samples (e.g., hundreds of samples) of the DC offset for the baseband signals and generate an average for each baseband signal based, at least in part, on the samples. In this example, the DSP 130 may subtract the DC offset from the corresponding baseband signal during steady state. In regards to the phase offset, the DSP 130 may introduce a phase shift in the baseband signals to minimize, eliminate, or otherwise reduce the phase shift generated by the elements in the reader 100. In some cases, varying a control value on one baseband signal (e.g., in-phase signal) can produce a change on the other baseband signal (e.g., quadrature signal). This cross-coupling between the two baseband signals can, in some implementations, lead to a more complex control algorithm for compensating for the phase shift offset.

The transmitter module 106 can include any software, hardware, and/or firmware operable to generate transmission signals for transponders. In the illustrated implementation, the transmitter module 106 includes a DAC 132, a LPF 134, a transmission mixer 136 and a power amplifier 138. The DAC 132 receives a digital signal from the DSP 130 and converts the digital signal to analog signals. For example, the digital signal can encode queries for transponders to identify associated information. The DAC 132 passes the analog signal to the LPF 134 to attenuate higher frequencies than a cutoff frequency from the analog signals. The LPF 134 passes the analog signals to the transmission mixer 136 to upconvert the baseband signals to an RF signals. In this case, the transmission mixer 136 receives a signal from the frequency synthesizer 128 and mixes this signal with the analog signal to generate the RF signal. The power amplifier 138 amplifies the RF signal and directs the amplified signal to the power splitter 108. In some implementations, the power splitter 108 may comprise a coupler.

Figure 2:
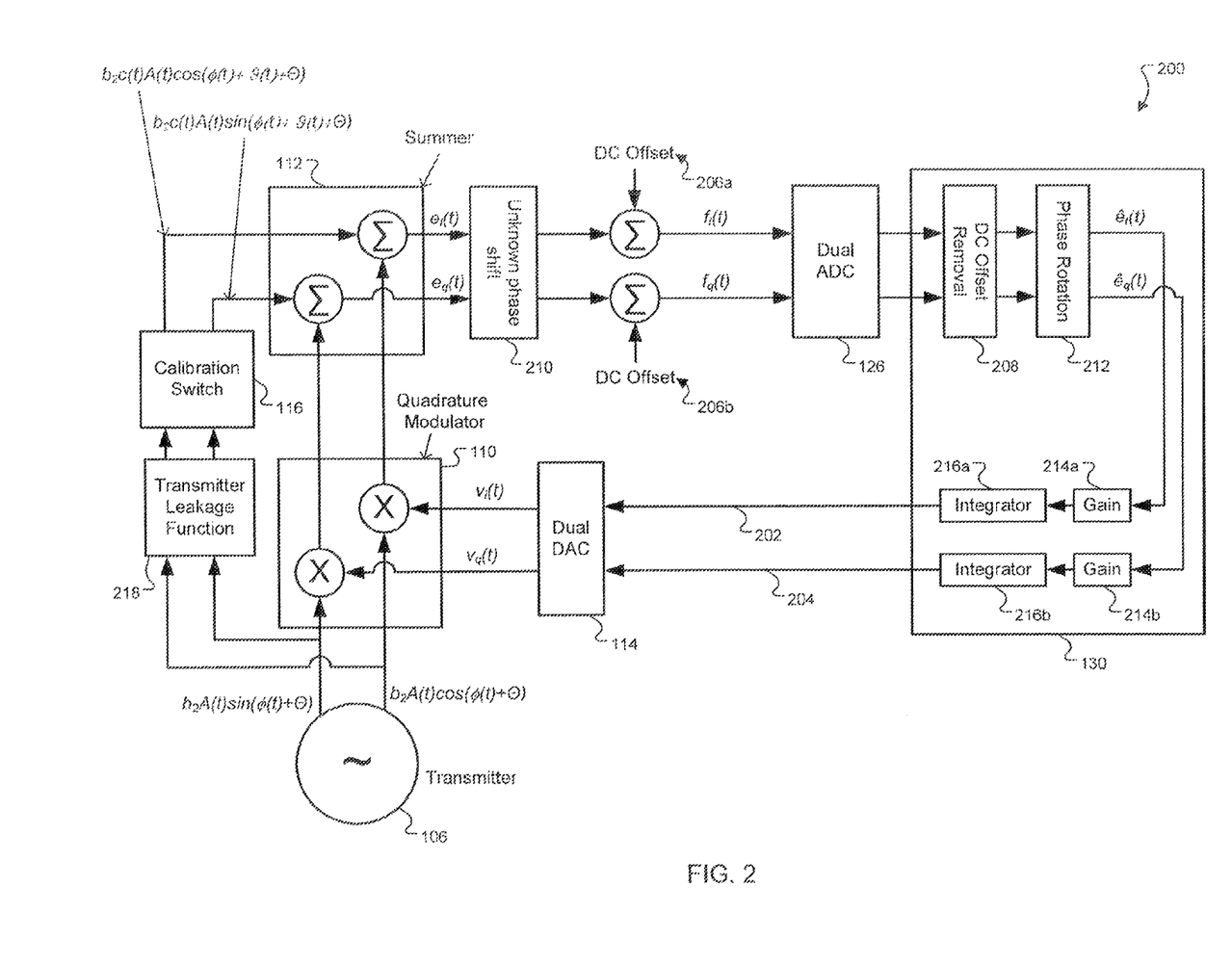
FIG. 2 is a block diagram illustrating an example mathematical model of the reader in FIG. 1.

FIG. 2 is a baseband equivalent model 200 of the CNR control loop of the reader 100 in FIG. 1. In particular, this baseband model 200 is mathematically a substantially equivalent model of the reader 100 with the RF carrier removed. The baseband model 200 includes the loops 202 and 204 which are associated with the in-phase signal and the quadrature signal. A portion of the loops 202 and 204 include associated control signals and are illustrated as the in-phase control signal $v_i(t)$ and the control quadrature signal $v_q(t)$ discussed above. As previously discussed, DC offsets are impairments that result from the elements in reader 100 and are typically associated with DC coupled applications. Phase offsets are impairments that result from the elements in reader 100 and are typically associated with RF and quadrature baseband applications.

Regarding the DC offsets, the loops 202 and 204 are effectively DC coupled loops and, as a result, DC offsets in the signal paths can directly effect the estimated control signals $v_i(t)$ and $v_q(t)$. Such DC offsets are represented in the model 200 as the DC offsets 206a and 206b. As discussed above, the DSP 130 eliminates, minimizes, or otherwise reduces these DC offsets from the loops 202 and 204. In the illustrated implementation, the DSP 130 includes a DC-offset-removal module 208 to subtract DC offsets from the in-phase signal and the quadrature signal. In addition, the module 208 may sample the baseband signals to estimate the DC offsets. For example, the module 208 may take hundreds of samples to determine average DC offsets to subtract from the baseband signals.

Regarding the phase-shift offsets, the elements in the reader 100 can impart a phase shift in the loops 202 and 204 and, as a result, this phase shift can directly effect the estimated control signals $v_i(t)$ and $v_q(t)$. For example, the phase shift can be due to quadrature modulator, summer, low noise amplifier, down conversion mixer, baseband filtering, and other elements. Such phase shifts in the loops 202 and 204 are represented in the model 200 as unknown phase shift 210. As discussed above, the DSP 130 eliminates, minimizes, or otherwise reduces these phase-shift offsets from the loops 202 and 204. In the illustrated implementation, the DSP 130 includes a phase rotation module 212 to de-rotate the in-phase signal and the quadrature signal by angle θ. In some implementations, the de-rotation is performed by a standard complex multiply of $e^{-j\theta}$. In addition, the module 212 may sample the baseband signals to estimate the phase-shift offsets. For example, the module 212 may take hundreds of samples to determine an average phase shift for each signal and de-rotate each signal in accordance with the associated averages.

In addition, the DSP 130 includes gains 214a-b and integrators 216a-b. The gains 214a-b allow the tracking bandwidth of the leakage cancellation system to be adjusted. The gains 214a and 214b may generate a gain value on each loop 202 and 204. In some implementations, the gains 214a and 214b generate gain values in light of a desire for fast convergence and loop stability. Further, the gain value can be adjusted over time to be large at first for quick approximation and then later made smaller to improve accuracy in the final results. Lower gain values reduce the bandwidth of the leakage cancellation system and make the system less responsive to noise signals. The integrators 216a-b filter the error signals to produce accurate control outputs.

The leakage path is illustrated in the model as the transmitter leakage function 218. This function 218, shown as a single element, typically results from a number of leakage paths, one of which can be the circulator 140. These leakage paths combine to yield a composite transmitter leakage function 218. The leakage signal is often a sinusoid of some general amplitude and phase where each is generally a function of the transmit frequency. In some implementations, the leakage signal can be an unpopulated sinusoid, because the transmitter is frequently unpopulated during the receive mode of operation. Though, the concept could be applied successfully as well with a relatively slowly modulated transmit carrier being used during receive operations. As mentioned above, the leakage signal of interest could be viewed as a sinusoid of some amplitude and phase and can be expressed in polar form.

Figure 3:
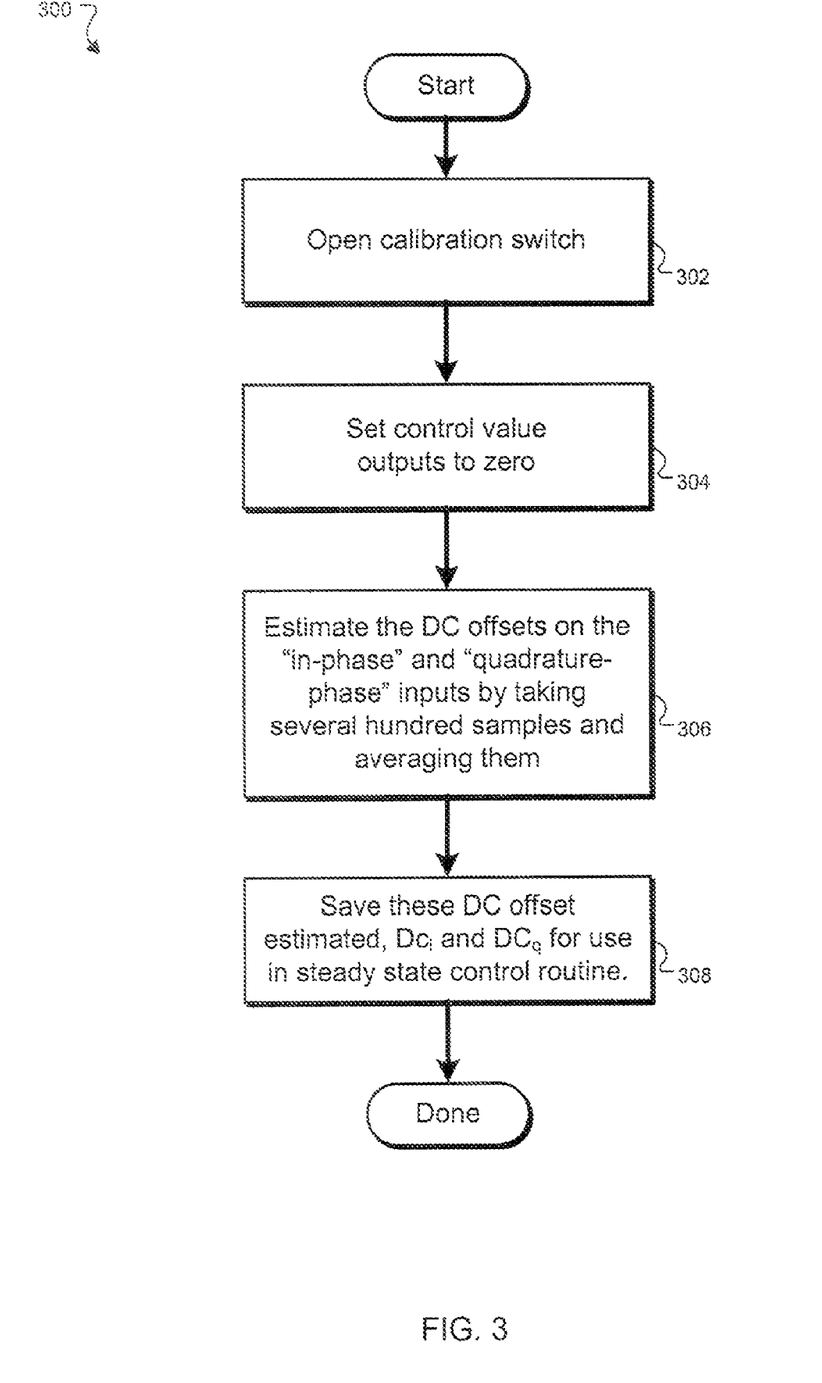
FIG. 3 is a flow chart illustrating an example method for estimating DC offsets for baseband signals.
Figure 4:
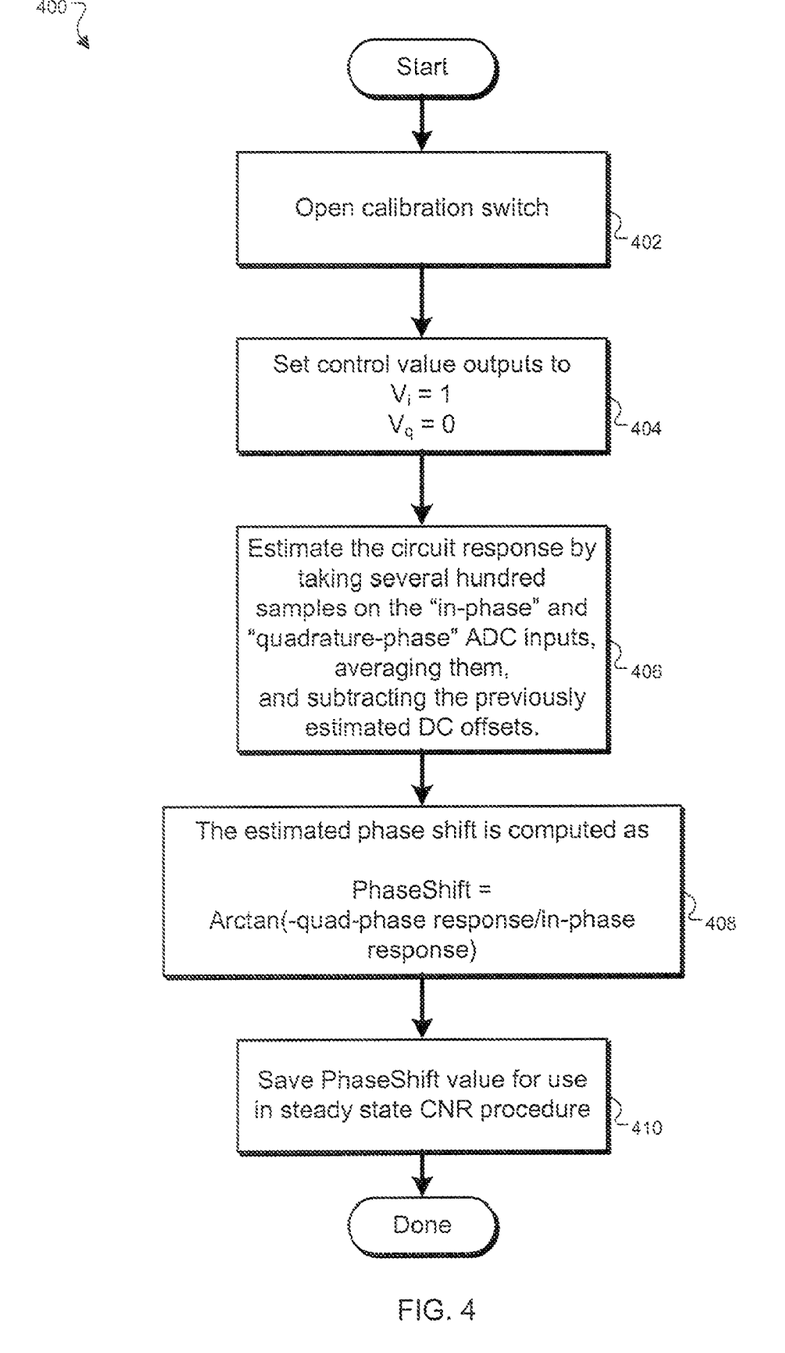
FIG. 4 is a flow chart illustrating an example method for estimating phase offsets for baseband signals.
Figure 5:
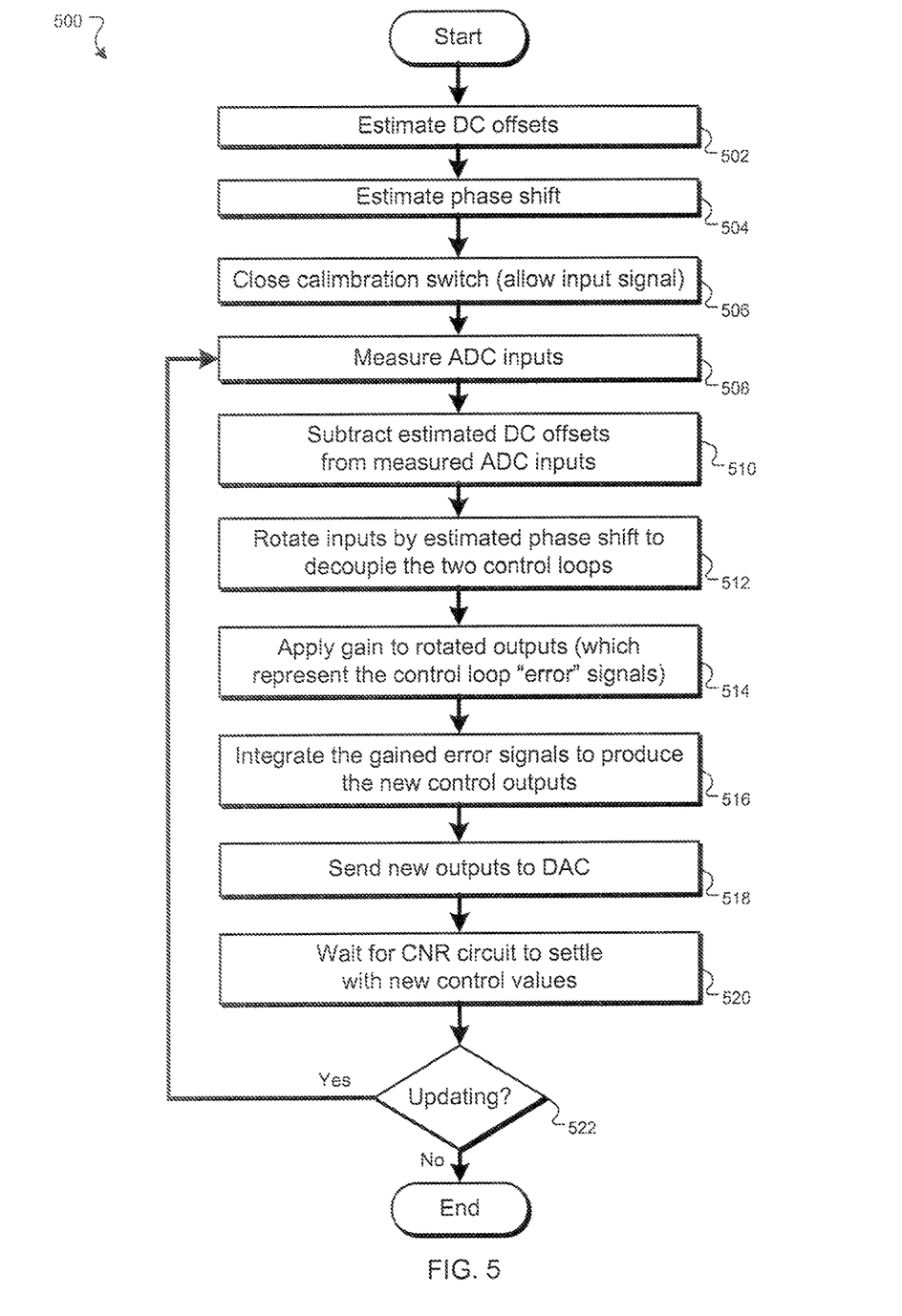
FIG. 5 is a flow chart illustrating an example method for reducing leakage signal in a receive path.

FIGS. 3-5 are flowcharts illustrating example methods 300, 400, and 500 for reducing impairments in baseband signals in accordance with some implementations of the present disclosure. Generally, method 300 describes an example technique for determining average DC offsets for the baseband signals. Method 400 generally describes an example technique for determining average phase offsets for the baseband signals. Method 500 generally describes an example technique for adjusting baseband signals for DC offsets and phase offsets prior to determining control signals associated with leakage signals. The reader 100 contemplates using any appropriate combination and arrangement of logical elements implementing some or all of the described functionality.

Regarding FIG. 3, the method 300 begins at step 302 where a calibration switch is opened. For example, the calibration switch 116 can be opened. At step 304, control value outputs are set to zero. In the example, the control value outputs $v_i(t)$ and $v_q(t)$ generated by the DSP 130 can be set to zero. Next, at step 306, the DC offsets are estimated for the in-phase signal and quadrature signal by taking several samples (e.g., hundreds of samples). Returning to the example, the DSP 130 may take several samples of the baseband signals and average the samples to determine the DC offsets for each baseband signal. The in-phase DC offset and the quadrature DC offset are stored for use in the steady state control routine at step 308. As for the example, the DC offset removal module 208 may subtract the DC offset averages from the baseband signals while the reader 100 is in operation.

Referring to FIG. 4, the method 400 begins at step 402 where a calibration switch is opened. For example, the calibration switch 116 can be opened. At step 404, control value outputs are set to a known constant non-zero value. In the example, the control value outputs $v_i(t)$ and $v_q(t)$ generated by the DSP 130 can be set to $v_i(t)=1$ and $v_q(t)=0$. This example would ideally produce a baseband error signal with zero quadrature signal if there were no phase shift. Next, at step 406, the DC offsets are estimated for the in-phase signal and quadrature signal by taking several samples (e.g., hundreds of samples) from ADC inputs, averaging these samples, and subtracting the previously estimated DC offsets. Returning to the example, the samples for the phase offset may be determined from the inputs to the ADC 126. At step 408, the phase shift offset for the baseband signals may be estimated as the arctangent of the ratio of the quadrature-phase response to the in-phase response. The estimated phase shift offsets are stored for use in the steady state control routine at step 410. As for the example, the phase rotation module 212 may de-rotate the baseband signals in accordance with the estimated phase shift.

Referring to FIG. 5, the method 500 begins at step 502 where estimates of the DC offsets of the baseband signals are estimated (this step was previously detailed in FIG. 3). For example, the DSP 130 may estimate the DC offsets for the in-phase signal and the quadrature signal by averages several samples. At step 504, the phase shift offsets are estimated (this step was previously detailed in FIG. 4). For example, the phase shift offsets may be measured from the inputs of ADC 126 and taking the average of several samples of the measured shifts. Next, at step 506, the calibration switch is closed to allow input signals. In the example, the calibration switch 116 may be closed to allow the input signal to be processed by the reader 100. The ADC inputs are measured at step 508. For example, the inputs to the dual ADC 126 can be measured. At step 510, the estimated DC offsets are subtracted from the measured ADC inputs. Returning to the example, the DC-offset-removal module 208 may subtract the estimated DC offsets from the baseband signals. Next, at step 512, the inputs are rotated by the estimated phase shift to decouple the two control loops. As for the example, the phase rotation module 212 may de-rotated the baseband signals using the estimated phase shift. At step 514, a gain is applied to the DC compensated, phase offset de-rotated, baseband error signals, which can represent the control loop "error" signals. The gained error signals are integrated to produce new control signals at step 516. For example, the integrators 216a and 216b may integrate the gained error signals to generate the control signals $v_i(t)$ and $v_q(t)$. The integrated signals are sent to a DAC at step 518. In the example, the integrators 216a and 216b may send the control signals $v_i(t)$ and $v_q(t)$ to the dual DAC 114. At step 520, a period is allowed for the CNR circuit to settle with the new control values. If the system is still operating at decisional step 522, the method 500 returns to the step 508. Otherwise, execution of method 500 ends.

A number of embodiments of the invention have been described. Nevertheless, it will be understood that various modifications may be made without departing from the spirit and scope of the invention.

What is claimed is:
1. A radio frequency identification (RFID) reader comprising:
  a radio frequency (RF) antenna;
  a transmitter section coupled to the RF antenna and operable to generate a transmit RF signal in a transmit path to be transmitted by the RF antenna;
  a receiver section coupled to the RF antenna and operable to receive a receive RF signal from the RF antenna in a receive path and downcovert the received signal to an in-phase baseband signal and a quadrature baseband signal;
  a digital signal processor operable to detect phase shifts, generated by components in the receive path, in the in-phase baseband signal and the quadrature baseband signal, substantially decouple the in-phase baseband signal and the quadrature baseband-signal based, at least in part, on the detected phase shifts, and generate an in-phase control signal and a quadrature control signal;
  a first splitter configure to pass at least a portion of the transmit RF signal in the transmit path to a quadrature modulator;

the quadrature modulator configured to generate a reduction signal based, at least in part, on the portion of the transmit RF signal and the in-phase control signal and the quadrature control signal and pass the cancellation signal to a second splitter; and the second splitter configured to combine the reduction signal with the receive RF signal in the receive path, the reduction signal configured to reduce the leakage signal in the receive path of the reader.

2. The RFID reader of claim 1, further comprising a DC offset module operable to subtract DC offsets from the in-phase baseband signal and the quadrature baseband signal associated with the leakage signal.

3. The RFID reader of claim 2, wherein the control signals for the reduction signal are determined after the in-phase baseband signal and quadrature baseband signal associated with the leakage signal are de-rotated and the DC offsets are subtracted.

4. The RFID reader of claim 2, further comprising a DC offset estimation module operable to determine a plurality of samples of the DC offsets of the in-phase baseband signal and the baseband quadrature signal associated with the leakage signal and determine the estimated DC offsets based, at least in part, on the average of the samples.

5. The RFID reader of claim 2, wherein the DC offsets are subtracted from the in-phase baseband signal and the quadrature baseband signal after downconverting the RF to the in-phase baseband signal and the quadrature baseband signal.

6. The RFID reader of claim 1, further comprising a phase estimation module operable to determine a plurality of samples of the phase offset of the in-phase baseband signal and the quadrature baseband signal associated with the leakage signal and determine the decoupling based, at least in part, on the average of the samples.

7. The RFID reader of claim 1, wherein the leakage signal is reduced by over 20 dB.

8. The RFID reader of claim 1, wherein the decoupling is based, at least in part, on a phase offset associated with the in-phase baseband signal and a phase offset associated with the quadrature baseband signal.

9. A method, comprising:
transmitting a Radio Frequency (RF) signal in an interrogation zone;
downconverting an RF signal on a receive path to an in-phase baseband signal and a quadrature baseband signal;
determining a phase-shift offset, generated by components in the receive path, in the in-phase baseband signal and the quadrature baseband signal;
substantially decoupling the in-phase baseband signal and the quadrature baseband signal based, at least in part, on the detected phase-shift offset;
generating an in-phase control signal and a quadrature control signal based, at least in part, on the decoupled in-phase baseband signal and quadrature baseband signal;
passing the in-phase control signal and the quadrature control signal to a quadrature modulator;
passing at least a portion of the transmit RF signal in the transmit path to the quadrature modulator;
generating a reduction signal based, at least in part, on the portion of the transmit RF signal and the in-phase control signal and the quadrature control signal;
combining the reduction signal to a second splitter with the receive RF signal in the receive path, the reduction signal configured to reduce the leakage signal in the receive path.

10. The method of claim 9, further comprising:
determining DC offsets of the in-phase baseband signal and the quadrature baseband signal; and
subtracting the DC offsets from the in-phase baseband signal and the quadrature baseband signal associated with the leakage signal.

11. The method of claim 10, wherein the control signals for the reduction signal are determined after the in-phase baseband signal and quadrature baseband signal associated with the leakage signal are de-rotated and the DC offsets are subtracted.

12. The method of claim 10, wherein the DC offsets are determined based, at least in part, on a plurality of samples of the DC offsets of the in-phase baseband signal and the quadrature baseband signal associated with the leakage signal.

13. The method of claim 10, wherein the DC offsets are subtracted from the in-phase baseband signal and the quadrature baseband signal after downconverting the RF signal to the in-phase signal and the quadrature signal.

14. The method of claim 9, wherein the phase-shift offset is determined, based at least in part, on a plurality of samples of the phase-shift offset of the in-phase baseband signal and the quadrature baseband signal associated with the leakage signal.

15. The method of claim 9, wherein the leakage signal is reduced by 20 dB or greater.

16. The method of claim 9, wherein the decoupling is based, at least in part, on a phase-shift offset associated with both the in-phase baseband signal and a phase offset associated with the baseband quadrature signal.

* * * * *

UNITED STATES PATENT AND TRADEMARK OFFICE
CERTIFICATE OF CORRECTION

PATENT NO. : 8,226,003 B2  Page 1 of 1
APPLICATION NO. : 11/741654
DATED : July 24, 2012
INVENTOR(S) : Thomas J. Frederick It is certified that error appears in the above-identified patent and that said Letters Patent is hereby corrected as shown below:

Column 8, line 55, claim 1, delete "downcovert" and insert -- downconvert --, therefor.

Signed and Sealed this
Second Day of October, 2012

David J. Kappos
*Director of the United States Patent and Trademark Office*